(12) United States Patent
Specht et al.

(10) Patent No.: US 6,474,142 B2
(45) Date of Patent: Nov. 5, 2002

(54) DEVICE FOR TESTING PRESSURE IN A GAS RESERVOIR

(75) Inventors: Martin Specht, Feldafing (DE); Thomas Kilian, Germering (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/972,610

(22) Filed: Oct. 8, 2001

(65) Prior Publication Data

US 2002/0100315 A1 Aug. 1, 2002

(30) Foreign Application Priority Data

Jan. 30, 2001 (DE) .......................................... 101 03 974

(51) Int. Cl.[7] .......................... G01M 3/00; G01H 1/00; B60R 21/26
(52) U.S. Cl. .............................. 73/52; 73/579; 280/736
(58) Field of Search ........................ 73/52, 579, 31.04, 73/702, 703; 431/13; 280/736, 737, 741

(56) References Cited

U.S. PATENT DOCUMENTS

| | | |
|---|---|---|
| 4,869,097 A | 9/1989 | Tittmann et al. ................ 73/52 |
| 5,351,527 A | 9/1994 | Blackburn et al. .............. 73/52 |
| 5,591,900 A | 1/1997 | Bronowocki et al. ........... 73/52 |
| 5,807,092 A | 9/1998 | Mifune et al. ................. 431/13 |
| 5,861,548 A | 1/1999 | Melvin, II et al. .............. 73/52 |
| 5,869,745 A | 2/1999 | Schroeder et al. .......... 73/31.04 |
| 6,247,725 B1 | 6/2001 | Möller ........................ 280/737 |
| 6,301,973 B1 | 10/2001 | Smith ..................... 73/861.357 |
| 6,339,960 B1 | 1/2002 | Costley et al. ................ 73/579 |

FOREIGN PATENT DOCUMENTS

| | | |
|---|---|---|
| DE | 19504218 | of 1995 |
| DE | 19535634 | of 1996 |
| DE | 19627878 | of 1999 |

*Primary Examiner*—Hezron Williams
*Assistant Examiner*—Jay Politzer
(74) *Attorney, Agent, or Firm*—Lonnie R. Drayer

(57) ABSTRACT

A device for testing the inflation state of an cold gas inflator for an airbag has a gas reservoir that is filled with gas at a high pressure, in particular an inert gas. Oscillations of frequencies varying within a particular frequency range are generated at the filled gas reservoir and the resonance frequency is measured. The measured resonance frequency is compared by a comparator with a resonance frequency which was determined at the gas reservoir filled with the desired pressure.

5 Claims, 1 Drawing Sheet

DEVICE FOR TESTING PRESSURE IN A GAS RESERVOIR

FIELD OF THE INVENTION

The present invention relates to a device for testing the pressure in a gas reservoir associated with an airbag containing gas at a high pressure.

BACKGROUND OF THE INVENTION

U.S. Pat. No. 4,869,097 teaches the measuring of the absolute pressure of a gas, for instance helium, contained in a reservoir, in particular a spherical reservoir. An ultrasonic generator is placed on the outside of the gas reservoir and ultrasonic waves are generated in a particular frequency range. These waves produce sympathetic oscillations of the gas in the reservoir, which are then measured. With the help of calibration curves, the pressure values of the gas contained in the reservoir are determined from the measured resonance frequencies. Since a significant number of successive measurements are required to obtain the pressure values corresponding to a particular resonance frequency, the known method and the known device for testing the internal pressure of airbag cold gas inflators, for instance during the inspection of a vehicle, in which the airbag and the cold gas inflators are installed, are not suitable. A cold gas inflator filled with an inert gas, e.g. helium, for the inflation of an airbag installed in a motor vehicle, is known from U.S. Pat. No. 6,247,725.

SUMMARY OF THE INVENTION

There is provided in accordance with the present invention a device for testing the internal pressure of a gas reservoir comprising: an oscillation transmitter that can be placed on the outside of the reservoir; an oscillation sensor that can be placed on the outside of the reservoir; and evaluation electronics comprising a comparator, connected to the oscillation sensor and a set value transmitter that indicates the resonance frequency measured under a set internal pressure, whereby the comparator compares the resonance frequency measured by the oscillation sensor with the resonance frequency indicated by the set value transmitter.

BRIEF DESCRIPTION OF THE DRAWING

The invention will be described in more detail with reference to the sole drawing FIGURE which is a diagrammatic view of a device for testing the internal pressure of a gas reservoir associated with an airbag and a block connection diagram of the thereto connected evaluation electronics.

DETAILED DESCRIPTION OF THE INVENTION

Figure 1:
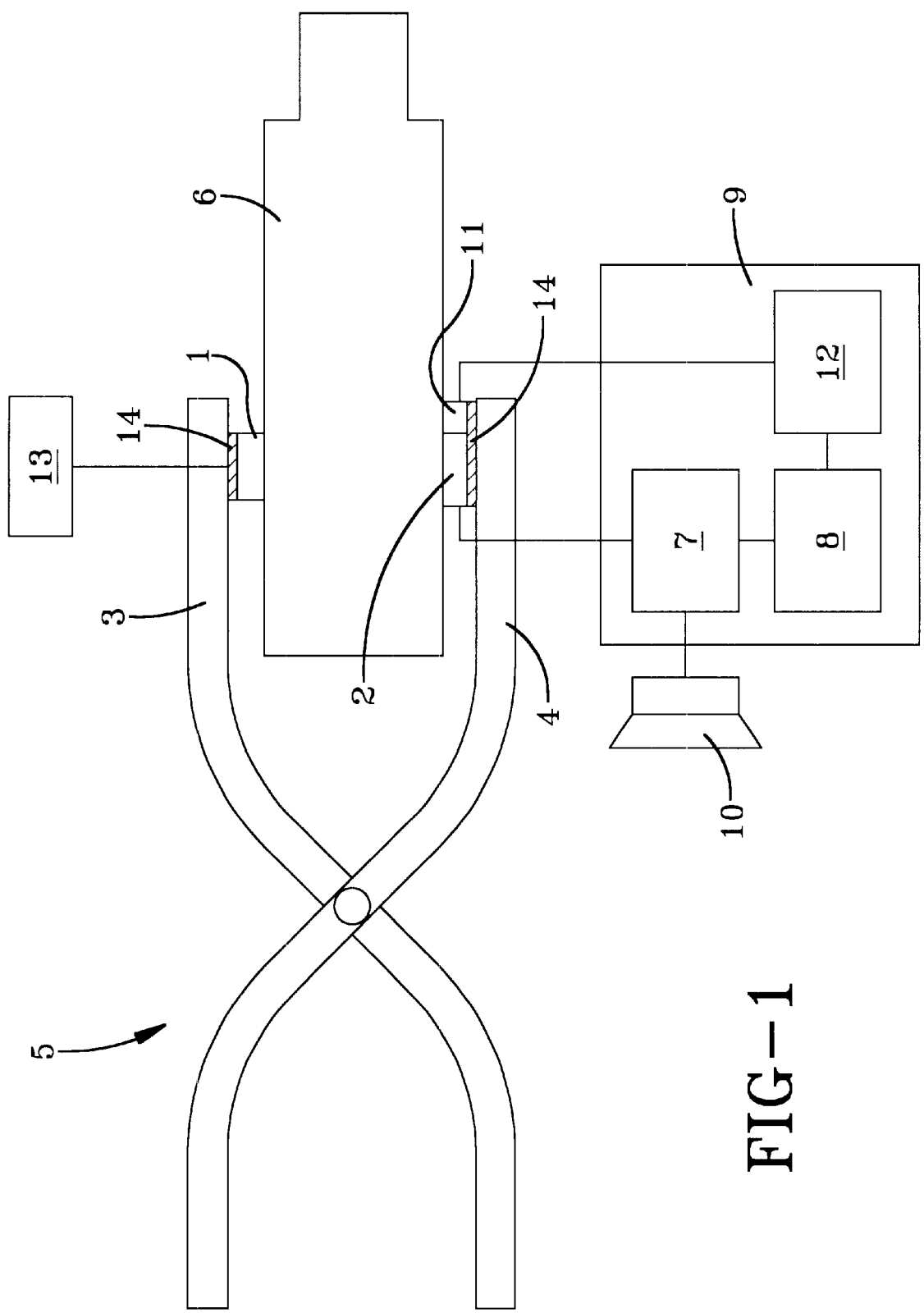

The FIGURE shows a gas reservoir 6 of a cold gas inflator for an airbag (not further represented) of a motor vehicle. It is understood that the present invention may also be employed with a hybrid inflator. For the measurement of the pressure of the airbag inflation gas, in particular an inert gas such as helium, argon or a mixture of these held in readiness and under high pressure in the reservoir, a testing device comprises an oscillation generator, formed of an oscillation transmitter 1 and a frequency generator 13, and an oscillation sensor 2 of an oscillation measuring device. The oscillation transmitter 1 and the oscillation sensor 2 can be set up with the help of tongs 5 at diametrical locations of the reservoir cross section on the casing surface of the gas reservoir 6, if necessary under application of pressure.

The required comparison can be carried out with the help of simple evaluation electronics. The resonance frequency corresponding to the set internal pressure can for instance be entered into a set value transmitter of the evaluation electronics. This way, resonance frequency values corresponding to varying internal pressures and varying types of gas reservoir associated with an airbags can be given as a comparison. To this effect the oscillation transmitter 1 is attached to the one jaw 3 and the oscillation sensor 2 to the other jaw 4 of the tongs 5 in an oscillation-decoupling manner. For the oscillation decoupling, a decoupling element 14, for instance, acting as an oscillation damper, can be foreseen. The decoupling element 14 preferably comprises an elastic material, via which an oscillation transmission from the oscillation transmitter 1 and the oscillation sensor 2 onto the jaws 3, 4 of the tongs can be avoided.

In addition, a temperature-measuring device 11 is foreseen, which can also be provided on one of the two jaws 3, 4, in the present embodiment on jaw 4, by interposing the decoupling element 14. The temperature-measuring device 11 measures the temperature of the gas reservoir 6. The oscillation transmitter 1 and the temperature-measuring device 11 are connected to the evaluation electronics 9 for the completion of the measuring device. The evaluation electronics 9 comprise a comparator 7, which is connected to the oscillation sensor 2 via (not further represented) converters, if necessary. In addition, the evaluation electronics 9 comprise a set value transmitter 8, in which the resonance frequency, which was measured in a gas reservoir 6 filled with a set pressure, is for instance contained or entered in a memory. The evaluation electronics 9 furthermore comprise a temperature compensator 12, which is connected to the set value transmitter 8 and the temperature-measuring device 11.

During testing of the inflation state of the gas reservoir 6, the oscillation transmitter 1 generates at the surface of the gas reservoir 6 oscillations with frequencies which change within a particular frequency range, preferably in an acoustic or ultrasonic spectrum. Through the oscillation sensor 2 the resonance frequency is gauged, and compared in the comparator 7 with a resonance frequency, which refers to the particular gas reservoir type and preferably corresponds to the resonance frequency that was determined at the gas reservoir 6 filled with the set gas pressure of the particular gas reservoir type. If the compared resonance frequencies coincide with one another, the gas reservoir associated with an airbag exhibits the required internal pressure. If the measured resonance frequency differs from the resonance frequency of the set pressure beyond a permissible tolerance, this can be indicated by a corresponding signal transmitter or display device, and the gas reservoir can be exchanged for a gas reservoir with sufficient internal pressure.

To increase the accuracy of the comparison a temperature-induced drift of the resonance frequency can be compensated for in the evaluation electronics 9 with the help of a temperature compensator 12. This is achieved by taking into account, during the comparison, the temperature difference between the temperature at which the resonance frequency was measured inside the reservoirs at the set pressure and the temperature at which the air bag gas reservoir testing is carried out. This can be realized by measuring the temperature of the gas reservoir at the same time as measuring the resonance frequency, and by taking this into account during the comparison by the evaluation electronics. Due to the temperature measuring by the measuring device 11, the temperature difference between the temperature at which the resonance frequency was measured at the set pressure and the temperature of the gas reservoir 6 during the testing, can be established. With the help of the temperature compensator 12, the set value of the resonance frequency is then correspondingly corrected in the set value transmitter 8. A high level of precision is obtained in the comparison for the measuring of the actual pressure present in the gas reservoir 6 with the set value.

If the compared resonance frequencies differ beyond the permissible tolerance, this can be indicated, for instance by a signal transmitter 10, which is connected to the evaluation electronics 9, either acoustically, optically or via another display device.

The testing of the internal pressure can be carried out not only during a routine inspection of a motor vehicle in which the airbag and gas reservoir have been installed, but also during the assembly of the airbag device and its installation in the motor vehicle.

In accordance with the provisions of the patent statutes, the present invention has been described in what is considered to represent a preferred embodiment. However, it should be noted that the invention can be practiced otherwise than as specifically illustrated and described without departing from it's spirit or scope.

We claim:

1. A device for testing the internal pressure of a gas reservoir comprising:

an oscillation transmitter that can be placed on the outside of the reservoir;

an oscillation sensor that can be placed on the outside of the reservoir;

tongs having jaws with the oscillation transmitter and the oscillation sensor arranged on the jaws of the tongs; and evaluation electronics comprising a comparator, connected to the oscillation sensor and a set value transmitter that indicates the resonance frequency measured under a set internal pressure, whereby the comparator compares the resonance frequency measured by the oscillation sensor with the resonance frequency indicated by the set value transmitter.

2. The device for testing the internal pressure of a gas reservoir according to claim 1 wherein a device that places the oscillation transmitter and the oscillation sensor onto the reservoir is oscillation-decoupled by the oscillation transmitter and the oscillation sensor.

3. The device for testing the internal pressure of a gas reservoir according to claim 1 wherein the device which places the oscillation transmitter and the oscillation sensor onto the reservoir is oscillation-decoupled from the oscillation transmitter and the oscillation sensor.

4. The device for testing the internal pressure of a gas reservoir according to claim 1 wherein the opening angle of the jaws is dimensioned such that the oscillation sensor and the oscillation transmitter can be pressed with a predetermined pressure against diametrical locations of the casing of the gas reservoir.

5. The device for testing the internal pressure of a gas reservoir according to claim 3 wherein the opening angle of the jaws is dimensioned such that the oscillation sensor and the oscillation transmitter can be pressed with a predetermined pressure against diametrical locations of the casing of the gas reservoir.

* * * * *